US008780884B2

(12) United States Patent
Choi et al.

(10) Patent No.: US 8,780,884 B2
(45) Date of Patent: Jul. 15, 2014

(54) MOBILE RADIO DEVICE SYNCHRONIZATION

(75) Inventors: Hyung-Nam Choi, Hamburg (DE);
 Andreas Schmidt, Braunschweig (DE);
 Michael Eckert, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1014 days.

(21) Appl. No.: 11/696,837

(22) Filed: Apr. 5, 2007

(65) Prior Publication Data
 US 2008/0247339 A1 Oct. 9, 2008

(51) Int. Cl.
 *H04J 3/06* (2006.01)
(52) U.S. Cl.
 USPC ............................................ 370/350; 370/503
(58) Field of Classification Search
 USPC ................ 370/281, 310.2, 319–324, 326, 370/328–331, 335–338, 342–350, 351–356, 370/432–442, 503–514, 520, 524; 455/434, 455/522, 553, 436–439, 442, 450, 11.1, 455/422.1, 436–452.1, 464, 13.2, 502, 509, 455/515, 76, 208, 265; 375/343; 709/231
 See application file for complete search history.

(56) References Cited

U.S. PATENT DOCUMENTS

| 6,246,673 | B1 * | 6/2001 | Tiedemann et al. | 370/333 |
| 6,766,146 | B1 * | 7/2004 | Park et al. | 455/69 |
| 7,403,789 | B2 * | 7/2008 | Takano et al. | 455/502 |
| 2001/0053191 | A1 * | 12/2001 | Tanno et al. | 375/343 |
| 2002/0196766 | A1 * | 12/2002 | Hwang et al. | 370/342 |
| 2003/0065805 | A1 * | 4/2003 | Barnes, Jr. | 709/231 |
| 2003/0139184 | A1 * | 7/2003 | Singh et al. | 455/436 |
| 2003/0235165 | A1 * | 12/2003 | Wang | 370/331 |
| 2005/0176437 | A1 * | 8/2005 | Mir | 455/450 |
| 2006/0193275 | A1 * | 8/2006 | Umesh et al. | 370/310 |
| 2007/0184835 | A1 * | 8/2007 | Bitran et al. | 455/434 |

FOREIGN PATENT DOCUMENTS

| DE | 198 41 469 | 4/2000 |
| WO | WO-00/16502 | 3/2000 |

OTHER PUBLICATIONS

3GPP TS 25.214 V7.3.0 (Dec. 2006); 3rd Generation Partnership Project; Technical Specification Group Radio Access Network; Physical layer procedures (FDD) (Release 7).
3GPP TS 25.211 V7.0.0 (Mar. 2006); 3rd Generation Partnership Project; Technical Specification Group Radio Access Network; Physical channels and mapping of transport channels onto physical channels (FDD)(Release 7).

* cited by examiner

*Primary Examiner* — San Htun
(74) *Attorney, Agent, or Firm* — Schwabe Williamson & Wyatt, P.C.

(57) ABSTRACT

Method for synchronizing a plurality of mobile radio devices, mobile radio devices and a method for synchronizing a mobile radio device. In one embodiment of the invention, a method for synchronizing a plurality of mobile radio devices is provided including transmitting a downlink synchronization signal in a shared downlink synchronization channel to a plurality of mobile radio devices, and receiving a plurality of uplink synchronization signals via a plurality of dedicated uplink synchronization channels.

35 Claims, 7 Drawing Sheets

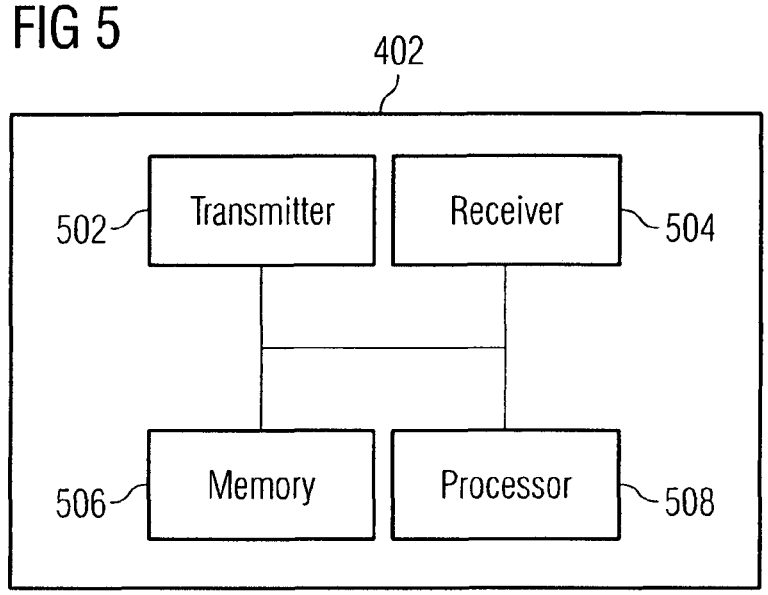
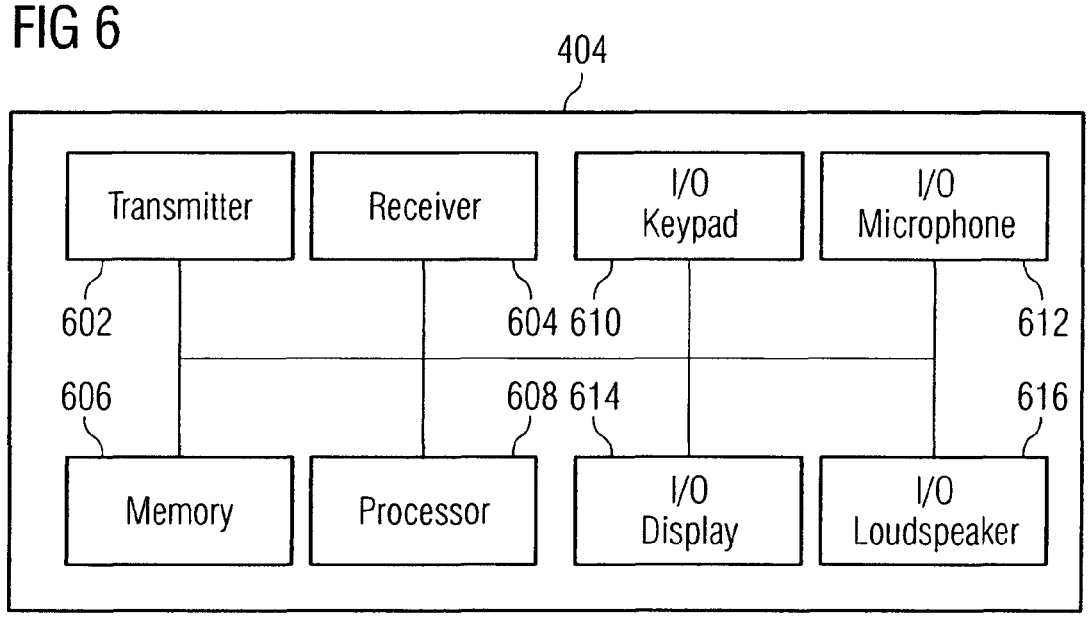

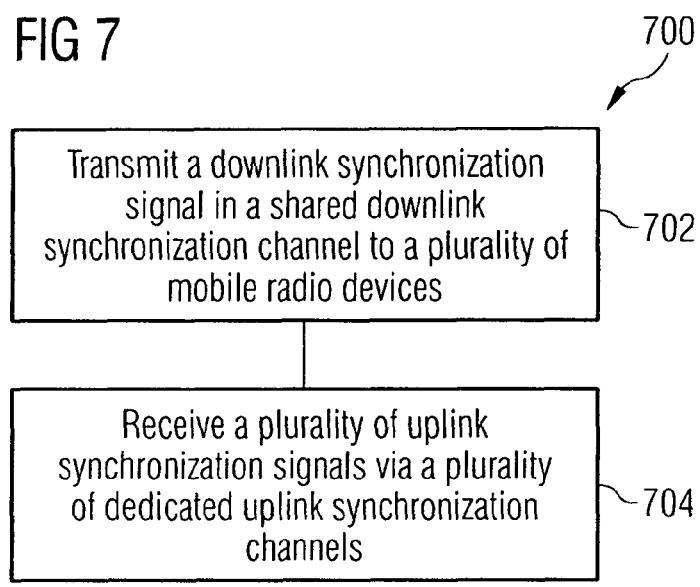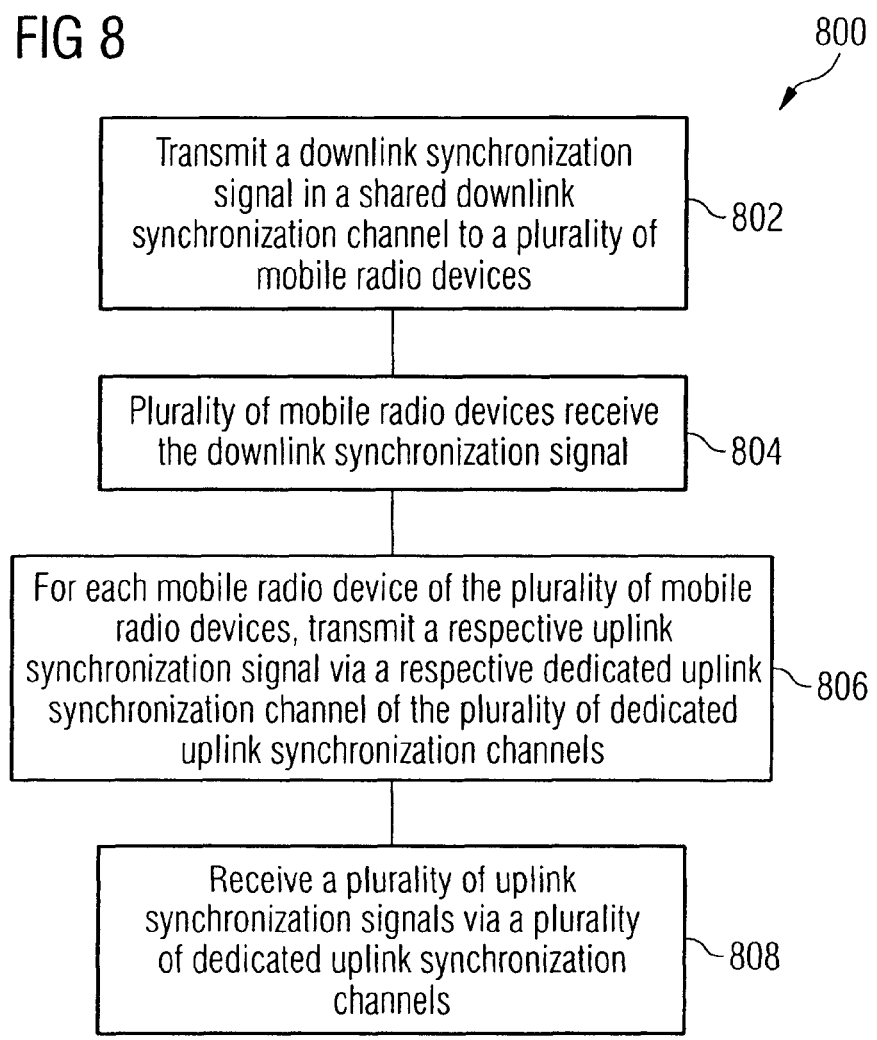

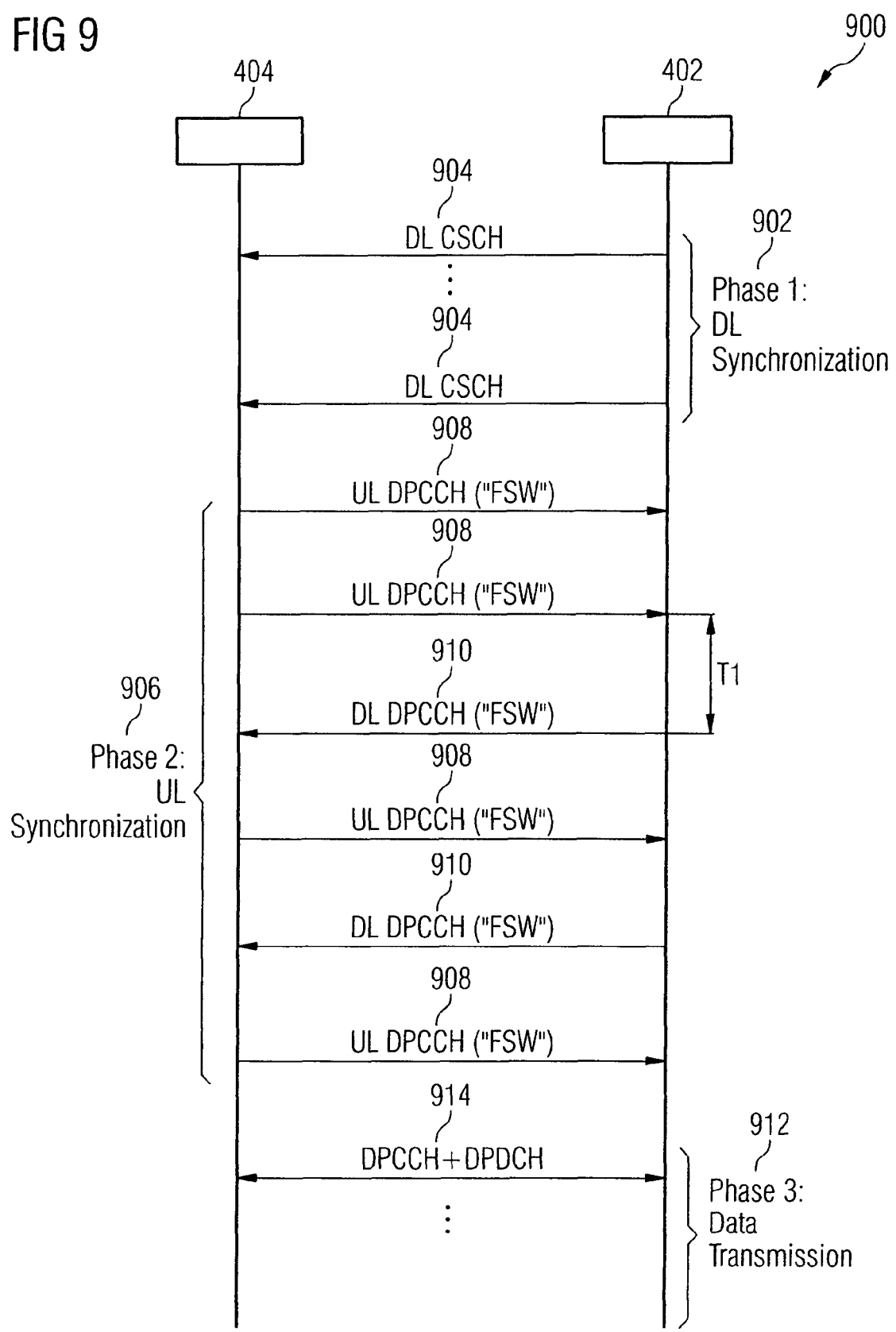

MOBILE RADIO DEVICE SYNCHRONIZATION

BACKGROUND

The present invention relates generally to a method for synchronizing a plurality of mobile radio devices, a method for synchronizing a mobile radio device, and mobile radio devices.

SUMMARY

In various embodiments, a method for synchronizing a plurality of mobile radio devices is provided. The method may include transmitting a downlink synchronization signal in a shared downlink synchronization channel to a plurality of mobile radio devices. The downlink synchronization signal may be common to the plurality of mobile radio devices. The method may further include receiving a plurality of uplink synchronization signals via a plurality of dedicated uplink synchronization channels. Each uplink synchronization signal may indicate that a respective mobile radio device has synchronized to the shared downlink synchronization channel.

In various embodiments, a mobile radio device may be provided. The mobile radio device may include a transmitter configured to transmit a downlink synchronization signal in a shared downlink synchronization channel to a plurality of mobile radio devices. The downlink synchronization signal may be common to the plurality of mobile radio devices. The mobile radio device may further include a receiver configured to receive a plurality of uplink synchronization signals via a plurality of dedicated uplink synchronization channels. Each uplink synchronization signal may indicate that a respective mobile radio device has synchronized to the shared downlink synchronization channel.

In various embodiments, a mobile radio device may be provided. The mobile radio device may include a receiver configured to receive a downlink synchronization signal in a shared downlink synchronization channel shared by a plurality of mobile radio devices. The downlink synchronization signal may be common to the plurality of mobile radio devices. The mobile radio device may further include a transmitter configured to transmit an uplink synchronization signal via a dedicated uplink synchronization channel. Each uplink synchronization signal may indicate that a respective mobile radio device has synchronized to the shared downlink synchronization channel.

In various embodiments, a method for synchronizing a mobile radio device may be provided. The method may include transmitting a downlink synchronization signal in a shared downlink synchronization channel to a mobile radio device. The downlink synchronization signal may be common to the plurality of mobile radio devices. The method may further include receiving an uplink synchronization signal via a dedicated uplink synchronization channel. Each uplink synchronization signal may indicate that a respective mobile radio device has synchronized to the shared downlink synchronization channel.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5 shows a mobile radio base station in accordance with an embodiment of the invention;

FIG. 6 shows a mobile radio communication terminal in accordance with an embodiment of the invention;

FIG. 7 shows a flow diagram illustrating a method for synchronizing a plurality of mobile radio devices in accordance with an embodiment of the invention;

FIG. 8 shows a flow diagram illustrating a method for synchronizing a plurality of mobile radio devices in accordance with another embodiment of the invention;

FIG. 9 shows a message flow diagram illustrating a physical synchronization procedure in UMTS FDD mode in accordance with an embodiment of the invention.

DESCRIPTION

The standardization groups of the Third Generation Partnership Project (3GPP) are further developing mobile radio technologies such as e.g. Universal Mobile Telecommunications System (UMTS) in order to provide a mobile radio system which is optimized with regard to the transmission of data packets. This is tried to achieve by an improvement of the system capacity and the spectral efficiency. These developments are made in 3GPP under the term "Long Term Evolution" (LTE).

With UMTS LTE, the maximum net transmission rate should be substantially increased up to 100 Mbps (Megabit per second) in downlink transmission direction (i.e. e.g. the signal transmission from a respective associated base station (e.g. a UMTS base station) to a mobile radio communication terminal) and up to 50 Mbps in uplink transmission direction (i.e. e.g. the signal transmission from a mobile radio communication terminal to a respective associated base station (e.g. a UMTS base station)).

In order to achieve this, new multiple access procedures are considered. The existing UMTS system is based on CDMA (Code Division Multiple Access), in the following referred to as "legacy UMTS system". In an embodiment of the invention, the LTE-Downlink is based on Orthogonal Frequency Division Multiple Access (OFDMA) in combination with Time Division Multiple Access (TDMA), and the LTE-Uplink is based on Single-Carrier Frequency Division Multiple Access (SC-FDMA) in combination with Time Division Multiple Access (TDMA).

Figure 1:
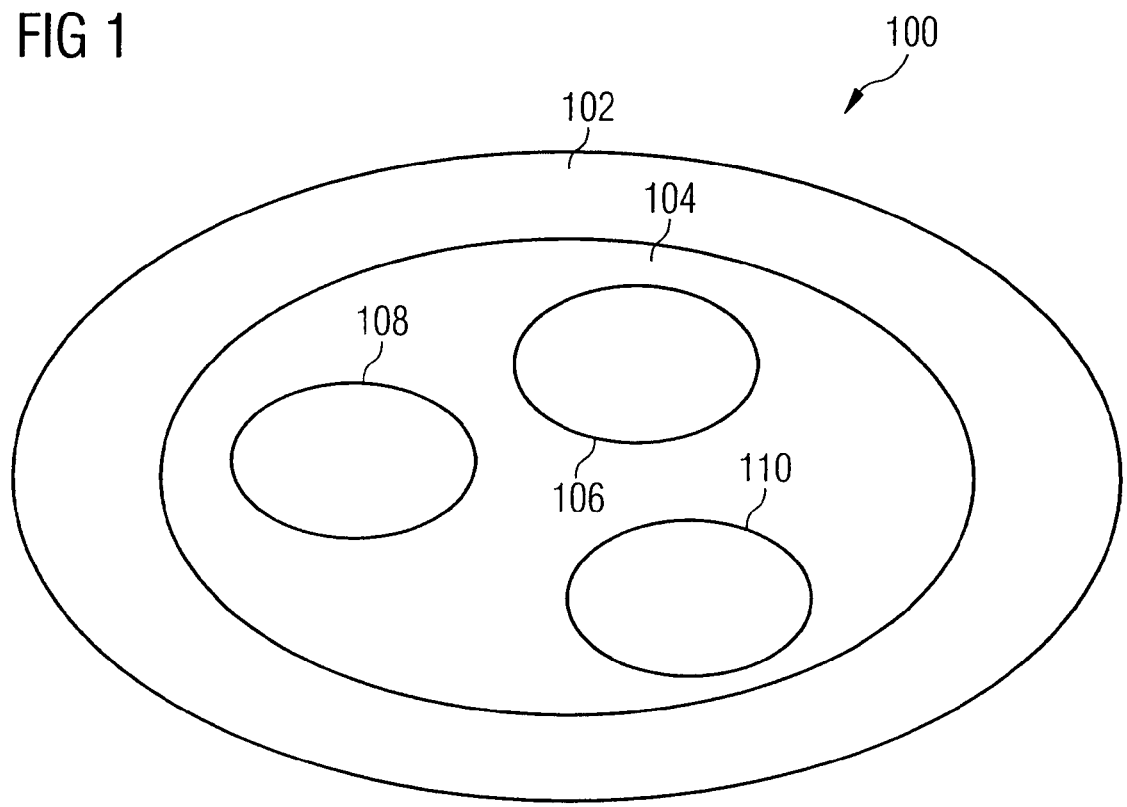
FIG. 1 shows an LTE mobile radio communication system in accordance with an embodiment of the invention.

Regarding an LTE mobile radio communication system 100 in accordance with an embodiment of the invention, a scenario will occur as shown in FIG. 1, wherein in a first starting phase of the LTE mobile radio communication system 100 a full coverage of the entire communication network area might be provided by using a GSM mobile radio communication system 102 and/or a legacy UMTS mobile radio communication system 104 as a basis and the network coverage using LTE will be provided e.g. in specific smaller areas 106, 108, 110, such as e.g. in hot-spots.

Bearing this scenario in mind, technical solutions are examined in the 3GPP standardization groups which achieve an efficient, i.e. fast handover of communication services from LTE to GSM/UMTS and vice versa. It is to be noted that in an alternative embodiment of the invention, other mobile radio communication networks, e.g. other cellular mobile radio communication networks, may be used, e.g. Code Division Multiple Access 2000 (CDMA 2000) or Freedom of Mobile Multimedia Access (FOMA). Furthermore, other access procedures, e.g. alternative multiple access procedures may be used in alternative embodiments of the invention. Thus, the embodiments of the invention are neither limited to the 3GPP mobile radio communication systems nor to the specifically mentioned multiple access schemes.

With regard to the time duration of the execution of a handover from LTE to legacy UMTS, for example, one factor is the time required for setting up a dedicated mobile radio communication connection in UMTS, more specifically, the time required for the execution of the synchronization procedure.

In an embodiment of the invention, a method for a fast synchronization of a dedicated mobile radio communication connection is provided, e.g. a method for a fast synchronization of a dedicated mobile radio communication connection in a Frequency Division Duplex (FDD) mode is provided, e.g. in a UMTS FDD mode.

Figure 2:
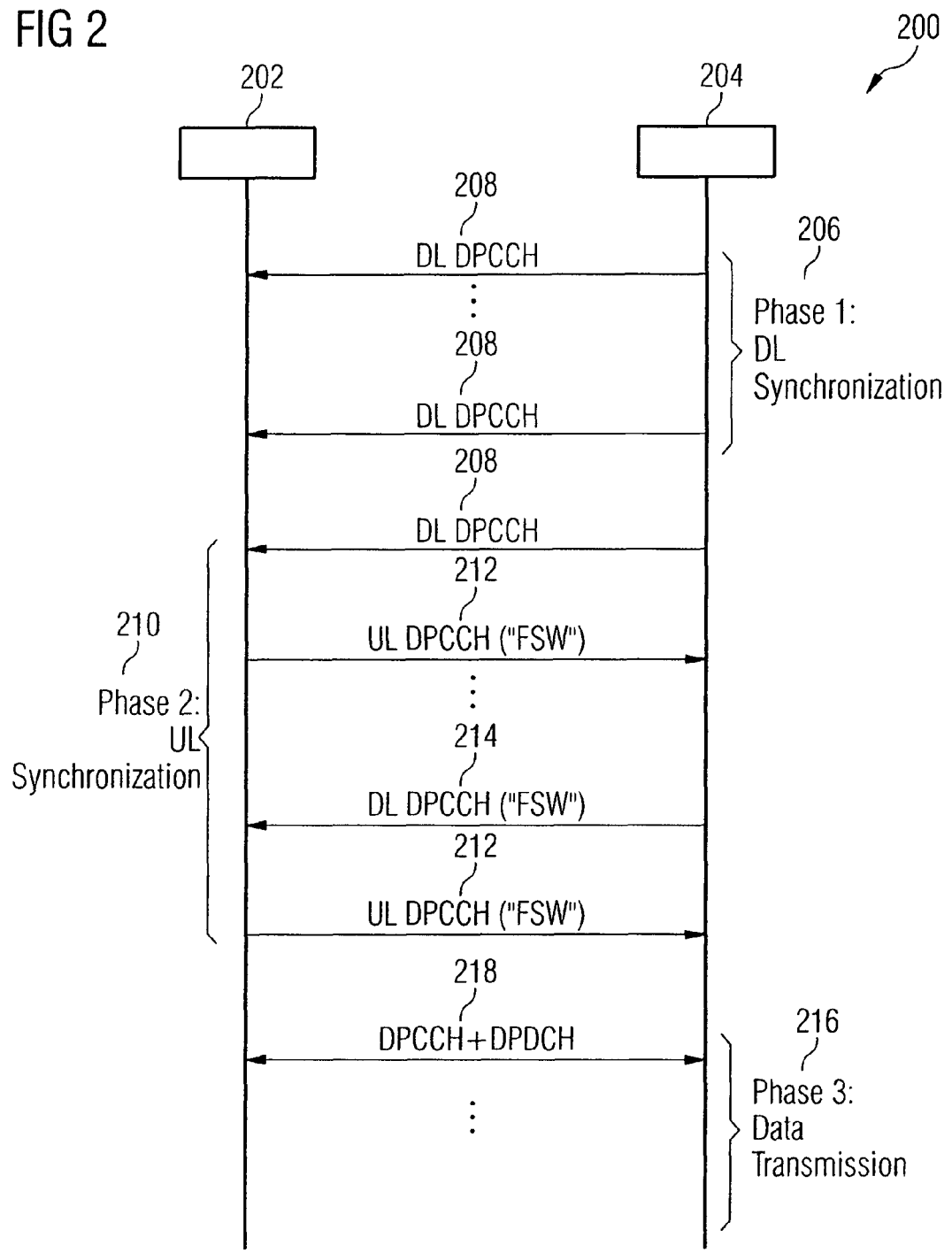
FIG. 2 shows a message flow diagram illustrating a conventional physical synchronization procedure in UMTS FDD mode.

FIG. 2 shows a message flow diagram 200 illustrating a conventional physical synchronization procedure in UMTS FDD mode.

The physical synchronization procedure is carried out between a communication terminal 202 such as e.g. a User Equipment (UE) and a mobile radio communication network unit 204 such as e.g. a mobile radio access network communication network unit, e.g. a base station such as e.g. a NodeB in the exemplary case of LTE and UMTS.

In a first phase 206, a downlink synchronization (DL Synchronization) is carried out. In the downlink synchronization, the NodeB 204 transmits the downlink Dedicated Physical Control Channel (DPCCH), in other words, DPCCH frames 208, to the communication terminal 202 in the downlink direction. In this case, specific Pilot and Transmit Power Control (TPC) patterns, which only consist of logical value "1" signals, are transmitted in a frame-wise manner. Only the communication terminal 202 tries to synchronize itself to the downlink Dedicated Physical Control Channel (DL DPCCH), i.e. only the communication terminal 202 tries to adapt itself to the frame timing. The other communication terminals which are located in the coverage region of the mobile radio base station synchronize themselves in a similar manner using other separate downlink Dedicated Physical Control Channels (DPCCH).

In a second phase 210, after a successful DL Synchronization, e.g. having used a DPCCH frame 208, the communication terminal 202 in turn transmits the Dedicated Physical Control Channel (DPCCH), in other words, DPCCH frames 212, to the NodeB 204 in the uplink direction. In this case, usually, only the TPC bits and the Pilot bits are transmitted in each slot of the frames in the uplink Dedicated Physical Control Channel (UL DPCCH). During the second phase 210, the communication terminal 202 transmits a so-called Frame Synchronization Word (FSW) using specific pilot bits using the pilots, in order to signal to the NodeB 204, that the communication terminal 202 has synchronized to the DL DPCCH. The TPC bits in the DPCCH frames 212 are transmitted in accordance with the power control method to be executed. The NodeB 204 tries in turn to synchronize itself to the uplink Dedicated Physical Control Channel (UL DPCCH), i.e. the NodeB 204 tries to adapt itself to the frame timing in uplink direction. It is to be noted that the downlink Dedicated Physical Control Channel (DL DPCCH) is continuously transmitted from the NodeB 204 to the communication terminal 202, even after the communication terminal 202 has been synchronized.

In a third phase 216, after a successful UL Synchronization, e.g. having used an UL DPCCH frame 212, and after the NodeB 204 has transmitted a so-called Frame Synchronization Word (FSW) in a DL DPCCH frame 214 using specific pilot bits using the pilots, in order to signal to the communication terminal 202, that the NodeB 204 has synchronized to the UL DPCCH. Then, the communication terminal 202 and the NodeB 204 transmit their data using the respective Dedicated Physical Data Channel (DPDCH) in the uplink direction and in the downlink direction, respectively (in other words, the DPCCH and the DPDCH are established, symbolized in FIG. 2 by a reference numeral 218). It is to be noted that the uplink Dedicated Physical Control Channel (UL DPCCH) is continuously transmitted from the communication terminal 202 to the NodeB 204, even after the communication terminal 202 has been synchronized.

Figure 3:
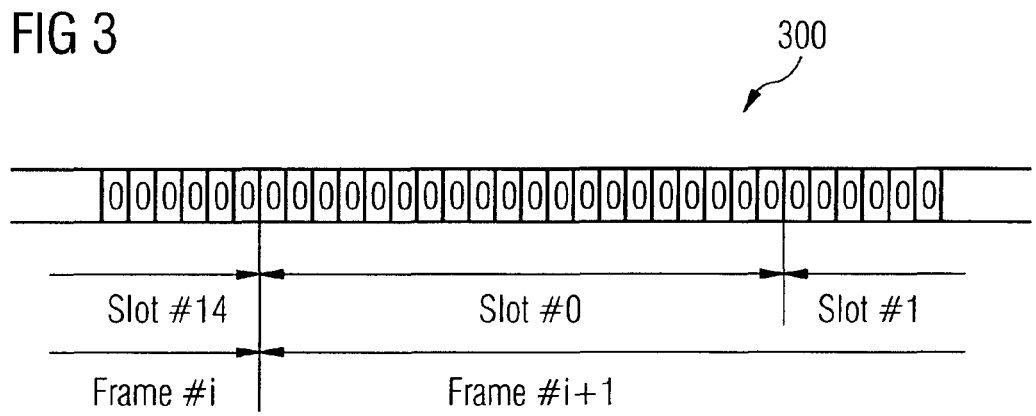
FIG. 3 shows the bit sequence of a conventional Primary Common Pilot Channel.

Furthermore, in accordance with the UMTS FDD mode, the Primary Common Pilot Channel (P-CPICH) is specified as the downlink pilot channel. The P-CPICH is broadcasted into the entire mobile radio cell and therewith is an important channel in the context of the UMTS FDD mode. A predefined bit sequence 300 consisting of "0" signals is transmitted on the P-CPICH, as shown in FIG. 3. The P-CPICH serves as a phase reference for other physical channels and for a channel estimation within the mobile radio cell.

Figure 4:
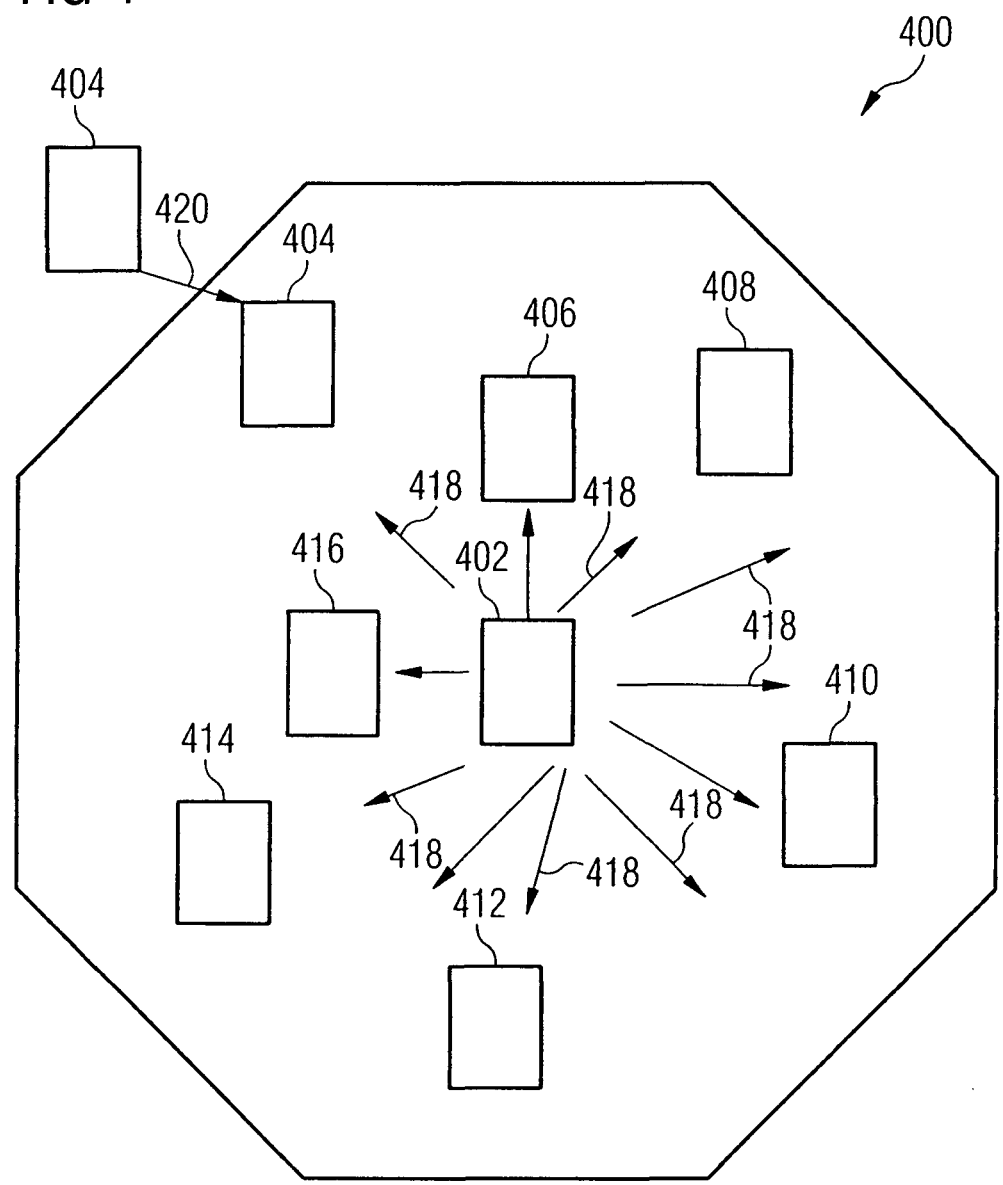
FIG. 4 shows a mobile radio cell in accordance with an embodiment of the invention.

FIG. 4 shows a mobile radio cell 400 in accordance with an embodiment of the invention.

Although only one mobile radio cell 400 is shown, an arbitrary number of mobile radio cells may be provided in an embodiment of the invention. Each mobile radio cell 400 includes one or a plurality of mobile radio base stations 402. The mobile radio base station 402 is a unit of the mobile radio access network, e.g. in the case of a UMTS mobile radio cell, the mobile radio base station 402 is also referred to as NodeB and is a unit of the UMTS radio access network (UTRAN). Each mobile radio base station 402 is connected to the Core Network (not shown) on the network side, for example. Furthermore, each mobile radio base station 402 provides a mobile radio interface to communication terminals 404, 406, 408, 410, 412, 414, 416, thereby providing a mobile radio communication connection between the mobile radio base station 402 and the communication terminals 404, 406, 408, 410, 412, 414, 416, and to other communication terminals, for example. In the case of UMTS, the communication terminals 404, 406, 408, 410, 412, 414, 416 are also referred to as User Equipments (UE).

In an embodiment of the invention, it is assumed that the communication terminal 404 has an established LTE communication connection to an LTE-capable base station. By way of example, it is assumed that the communication terminal 404 leaves one of the specific smaller areas 106, 108, 110 and enters an area that is covered by the legacy UMTS mobile radio communication system 104 and not by an LTE mobile radio communication system when entering e.g. the mobile radio cell 400. Thus, it is assumed in the following that the communication terminal 404 performs a handover procedure from an LTE mobile radio communication system to a UMTS mobile radio communication system 104. However, it should be noted that any other type of handover procedure, e.g. a handover procedure from a UMTS mobile radio communication system to an LTE mobile radio communication system, from a GSM mobile radio communication system to a UMTS mobile radio communication system or to an LTE mobile radio communication system or vice versa may be provided using the procedures as described in the embodiments of the invention. Furthermore, any other type of handover procedure may use the embodiments of the invention. Moreover, the embodiments of the invention are not limited to a handover procedure but can be applied in any procedure in which a synchronization of one or a plurality of mobile radio devices is required.

As will be described in more detail below, the mobile radio base station 402 transmits signals into the mobile radio cell 400 to all communication terminals 404, 406, 408, 410, 412, 414, 416 being located in the coverage area of the mobile radio base station 402 via one or a plurality of so-called shared channels or to a specific communication terminal of the communication terminals 404, 406, 408, 410, 412, 414, 416 via one or a plurality of so-called dedicated channels. Furthermore, the communication terminals 404, 406, 408, 410, 412, 414, 416 may transmit signals to the mobile radio base station 402 using one or a plurality of shared channels (which are used by a plurality of communication terminals 404, 406, 408, 410, 412, 414, 416) or using one or a plurality of dedicated channels (which are used by only one dedicated communication terminal).

The transmission of the signals is symbolized in FIG. 4 by means of arrows 418.

Furthermore, FIG. 4 shows the entering of the communication terminal 404 into the mobile radio cell 400 (symbolized by means of a movement path 420), thereby starting a handover procedure from LTE to UMTS.

FIG. 5 shows the mobile radio base station 402 in accordance with an embodiment of the invention in more detail.

In an embodiment of the invention, the mobile radio base station 402 is a UMTS mobile radio base station 402 and includes e.g. one transmitter 502 or a plurality of transmitters 502 (each transmitter 502 e.g. including one or a plurality of mobile radio antennas), one receiver 504 or a plurality of receivers 504 (each receiver 504 e.g. including one or a plurality of mobile radio antennas), a memory 506 and a processor 508, e.g. a microprocessor. The processor 508 can be any kind of programmable logic or hard-wired logic.

Furthermore, the UMTS mobile radio base station 402 may include other components such as e.g. encoder/decoder circuits, and other commonly provided components which are not shown in the figures for reasons of simplicity.

The UMTS mobile radio base station 402 transmits the respective signals via the transmitter 502 to the one or more communication terminals 404, 406, 408, 410, 412, 414, 416 in the respectively provided mobile radio channels, e.g. mobile radio downlink channels, some of which will be described in more detail below. Furthermore, the UMTS mobile radio base station 402 receives the respective signals via the receiver 504 from the one or more communication terminals 404, 406, 408, 410, 412, 414, 416 in the respectively provided mobile radio channels, e.g. mobile radio uplink channels, some of which will be described in more detail below.

The decoded information bits (control data as well as user data) and the information bits to be encoded (control data as well as user data) are stored in the memory 506. The memory 506 may include one or more memories, including volatile memory (e.g. dynamic random access memory) and/or non-volatile memory (e.g. Flash EEPROM memory, e.g. floating gate memory or charge trapping memory, or magnetoresistive memory, resistivity changing memory, e.g. conductive bridging memory, phase change memory, etc.). Furthermore, computer instruction code being executed e.g. by the processor 508, may be stored in the memory 506.

The processor 508 may be configured to provide the services and processes provided for establishing and maintaining communication connections, e.g. the services and processes of the mobile radio base station 402 in accordance with embodiments of the invention, which will be described in more detail below.

FIG. 6 shows a mobile radio communication terminal, e.g. mobile radio communication terminal 404, in accordance with an embodiment of the invention.

In an embodiment of the invention, the mobile radio communication terminal 404 is a UMTS User Equipment 404 and includes e.g. one transmitter 602 or a plurality of transmitters 602 (each transmitter 602 e.g. including one or a plurality of mobile radio antennas), one receiver 604 or a plurality of receivers 604 (each receiver 604 e.g. including one or a plurality of mobile radio antennas), a memory 606 and a processor 608, e.g. a microprocessor. The processor 608 can be any kind of programmable logic or hard-wired logic. Moreover, the mobile radio communication terminal 404 may include various input/output devices such as for example an input/output keypad 610, an input/output microphone 612, an input/output display 614, and/or an input/output loudspeaker 616.

Furthermore, the UMTS User Equipment 404 may include other components such as e.g. encoder/decoder circuits, and other commonly provided components which are not shown in the figures for reasons of simplicity.

The UMTS User Equipment 404 transmits the respective signals via the transmitter 602 to the mobile radio base station 402 in the respectively provided mobile radio channels, e.g. mobile radio uplink channels, some of which will be described in more detail below. Furthermore, the UMTS User Equipment 404 receives the respective signals via the receiver 604 from the mobile radio base station 402 in the respectively provided mobile radio channels, e.g. mobile radio downlink channels, some of which will be described in more detail below.

The decoded information bits (control data as well as user data) and the information bits to be encoded (control data as well as user data) are stored in the memory 606. The memory 606 may include one or more memories, including volatile memory (e.g. dynamic random access memory) and/or non-volatile memory (e.g. Flash EEPROM memory, e.g. floating gate memory or charge trapping memory, or magnetoresistive memory, resistivity changing memory, e.g. conductive bridging memory, phase change memory, etc.). Furthermore, computer instruction code being executed e.g. by the processor 608, may be stored in the memory 606.

The processor 608 may be configured to provide the services and processes provided for establishing and maintaining communication connections, e.g. the services and processes of the mobile radio communication terminal 404 in accordance with embodiments of the invention, which will be described in more detail below.

FIG. 7 shows a flow diagram 700 illustrating a method for synchronizing a plurality of mobile radio devices in accordance with an embodiment of the invention.

At 702, a downlink synchronization signal is transmitted in a shared downlink synchronization channel to a plurality of mobile radio devices. The shared downlink synchronization channel may be a shared downlink synchronization control channel. Furthermore, in an embodiment of the invention, the shared downlink synchronization channel is a frequency division duplex shared downlink synchronization control channel. As will be described in more detail below, the shared downlink synchronization channel may include a transmit power control (TPC) information indicating a power control procedure to be used, e.g. so-called TPC bits. Furthermore, the shared downlink synchronization channel may include pilot signal information shared by the plurality of mobile radio devices, e.g. so-called pilot bits. Details about the structure of the shared downlink synchronization channel in accordance with an embodiment of the invention will be described in more detail below.

At 704, a plurality of uplink synchronization signals are received via a plurality of dedicated uplink synchronization channels. In an embodiment of the invention, the plurality of dedicated uplink synchronization channels are a plurality of dedicated uplink synchronization control channels. In another embodiment of the invention, the plurality of dedicated uplink synchronization channels are a plurality of dedicated physical control channels. Each uplink synchronization signal may include an information indicating that the respective mobile radio device has synchronized to the shared downlink synchronization channel.

Descriptively, in an embodiment of the invention, a new synchronization channel is provided which is used for synchronization of mobile radio communication terminals. The synchronization channel may be shared by a plurality of mobile radio communication terminals for synchronization. The synchronization channel will also be referred to as Common Synchronization Channel (CSCH) in the following.

Figure 10:
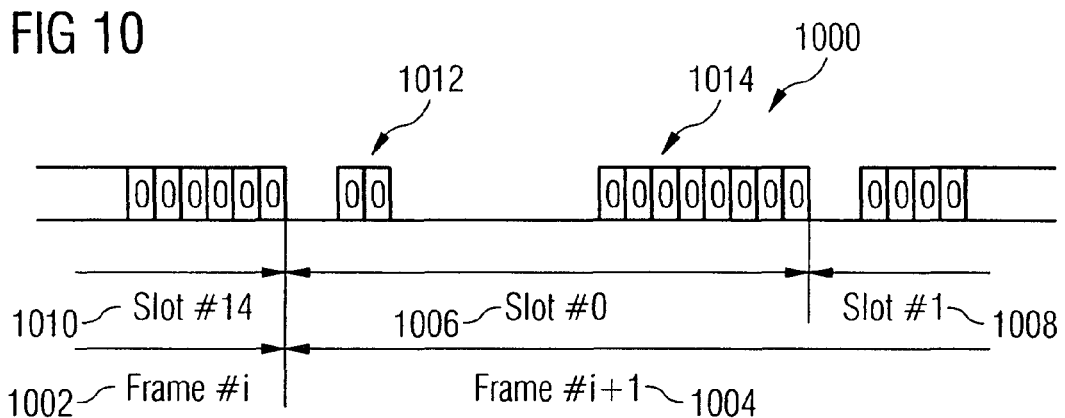
FIG. 10 shows the bit sequence of a Common Synchronization Channel in accordance with an embodiment of the invention.

FIG. 10 shows the bit sequence of a Common Synchronization Channel 1000 in accordance with an embodiment of the invention. As shown in FIG. 10, the CSCH 1000 includes a plurality of channel frames (FIG. 10 shows two channel frames #i 1002 and #i+1 1004), each channel frame 1002, 1004 including a plurality of channel slots (e.g. channel slot #0 1006, channel slot #1 1008, . . . , channel slot #14 1010), wherein the number of channel slots can be arbitrarily selected. Whereas the bit sequence 300 consisting of "0" signals of the conventional P-CPICH includes 20 "0" bit signals in each channel slot, in accordance with an embodiment of the invention, each channel slot 1006, 1008, 1010 of the Common Synchronization Channel 1000 has predefined bits (e.g. also having the logical value "0") to emulate specific information bits, e.g. TPC bits and/or pilot bits, which are transmitted at predefined positions within each slot, wherein the position may e.g. be pre-stored in each mobile radio communication terminal or may be pre-transmitted from the mobile radio base station to the mobile radio communication terminals, e.g. in a so-called System Information Block (SIB). Thus, the mobile radio communication terminals are enabled to determined the information bits from the respective channel slots of the Common Synchronization Channel 1000. In an embodiment of the invention, each channel slot may include two information bits 1012 to emulate the TPC bits and eighth information bits 1014 to emulate the pilot bits. In an embodiment of the invention, the structure of the Common Synchronization Channel 1000 may be similar to the structure of a conventional Dedicated Physical Control Channel (DPCCH), with the difference, for example, that the Common Synchronization Channel 1000 is shared by a plurality of mobile radio communication terminals.

In an embodiment of the invention, a synchronization procedure is provided including a phase for a common (shared) downlink synchronization using the new synchronization channel, e.g. the Common Synchronization Channel 1000, and a subsequent phase for a dedicated uplink synchronization and a dedicated downlink synchronization, using e.g. the Dedicated Physical Control Channel (DPCCH).

One effect of embodiments of the invention is that the time required for the synchronization of a dedicated mobile radio connection, e.g. in an FDD mode, e.g. in the UMTS FDD mode, is shortened.

Another effect of embodiments of the invention is that the establishment of dedicated mobile radio connections for a plurality of mobile radio communication terminals, e.g. for a plurality of User Equipments, can be carried out faster.

FIG. 8 shows a flow diagram 800 illustrating a method for synchronizing a plurality of mobile radio devices in accordance with another embodiment of the invention.

At 802, a downlink synchronization signal is transmitted in a shared downlink synchronization channel to a plurality of mobile radio devices. The shared downlink synchronization channel may be a shared downlink synchronization control channel. Furthermore, in an embodiment of the invention, the shared downlink synchronization channel is a frequency division duplex shared downlink synchronization control channel. As will be described in more detail below, the shared downlink synchronization channel may include a transmit power control (TPC) information indicating a power control procedure to be used, e.g. so-called TPC bits. Furthermore, the shared downlink synchronization channel may include pilot signal information shared by the plurality of mobile radio devices, e.g. so-called pilot bits. Details about the structure of the shared downlink synchronization channel in accordance with an embodiment of the invention will be described in more detail below.

At 804, the downlink synchronization signal is received by the plurality of mobile radio devices.

At 806, each mobile radio device of the plurality of mobile radio devices transmits a respective uplink synchronization signal via a respective dedicated uplink synchronization channel of the plurality of dedicated uplink synchronization channels, e.g. to the mobile radio base station.

At 808, a plurality of uplink synchronization signals are received via a plurality of dedicated uplink synchronization channels. In an embodiment of the invention, the plurality of dedicated uplink synchronization channels are a plurality of dedicated uplink synchronization control channels. In another embodiment of the invention, the plurality of dedicated uplink synchronization channels are a plurality of dedicated physical control channels. Each uplink synchronization signal may include an information indicating that the respective mobile radio device has synchronized to the shared downlink synchronization channel.

FIG. 9 shows a message flow diagram 900 illustrating a physical synchronization procedure in UMTS FDD mode in accordance with an embodiment of the invention.

In this message flow diagram 900 it is assumed that in a UMTS FDD mobile radio cell (e.g. the mobile radio cell 400), the above described shared downlink synchronization channel (e.g. the Common Synchronization Channel 1000 in accordance with FIG. 10) is transmitted (e.g. broadcasted) from the mobile radio base station (e.g. the mobile radio base station 402), e.g. a NodeB, to all communication terminals (e.g. communication terminals 404, 406, 408, 410, 412, 414, 416), e.g. to all User Equipments, which are located in the UMTS FDD mobile radio cell (e.g. the mobile radio cell 400).

In an embodiment of the invention, the synchronization of a dedicated mobile radio connection will be carried out as will be described in more detail below with reference to FIG. 9.

In a first phase 902 (also referred to as a common downlink synchronization on the CSCH), a downlink synchronization (DL Synchronization) is carried out. In an embodiment of the invention, the downlink synchronization, the NodeB (e.g. the NodeB 404) transmits the Common Synchronization Channel (CSCH) 904, in other words, CSCH frames 904, e.g. using the same structure of the conventional Dedicated Physical Control Channel (DPCCH), wherein in each channel slot per channel frame only the TPC bits and the pilot bits are transmitted in the downlink direction. In this case, specific Pilot and Transmit Power Control (TPC) patterns, which only consist of "1" signals, is transmitted in a frame-wise manner. All communication terminals, which should try to establish a dedicated mobile radio connection, try to synchronize themselves to the downlink Common Synchronization Channel (CSCH), i.e. the communication terminals try to adapt themselves to the frame timing. In an embodiment of the invention, the structure of the Common Synchronization Channel (CSCH) 1000 as shown in FIG. 10 may be used.

In a second phase 906 (also referred to as dedicated uplink synchronization and dedicated downlink synchronization on the DPCCHs), after a successful DL Synchronization, e.g. having used a CSCH frame 904, the respective communication terminal 404 in turn transmits the uplink Dedicated Physical Control Channel (DPCCH), in other words, UL DPCCH frames 908, to the NodeB (e.g. the NodeB 402) in the uplink direction. In this case, usually, only the TPC bits and the Pilot bits are transmitted in each slot of the frames in the uplink Dedicated Physical Control Channel (UL DPCCH). During the second phase 906, the communication terminal 404 transmits a so-called Frame Synchronization Word (FSW) using specific pilot bits using the pilots, in order to signal to the NodeB (e.g. the NodeB 402), that the communication terminal 404 has synchronized to the DL CSCH. The NodeB in turn transmits the downlink Dedicated Physical Control Channel (DPCCH), in other words, DL DPCCH messages 910 after a time T1, when it has received the first uplink Dedicated Physical Control Channel (DPCCH), in other words, UL DPCCH frames 908, correctly. The communication terminal 404 in turn is not required to synchronize itself to the downlink Dedicated Physical Control Channel (DPCCH). The NodeB (e.g. NodeB 402) tries in turn to synchronize itself to the uplink Dedicated Physical Control Channel (UL DPCCH), i.e. the (e.g. NodeB 402) tries to adapt itself to the frame timing in uplink direction. It is to be noted that the downlink Common Synchronization Channel (CSCH) 904, in other words, CSCH frames 904, is continuously transmitted from the NodeB (e.g. NodeB 402) to the communication terminals, even after the communication terminal 404 has been synchronized. After a successful uplink synchronization, the NodeB (e.g. NodeB 402) transmits a so-called Frame Synchronization Word (FSW) in a DL DPCCH message 910 using specific pilot bits using the pilots, in order to signal to the communication terminal 404, that the NodeB (e.g. NodeB 402) has synchronized to the UL DPCCH.

In a third phase 912, after a successful UL Synchronization and DL Synchronization on the respective DPCCH, the communication terminal 404 and the NodeB (e.g. NodeB 402) transmit their data using the respective Dedicated Physical Data Channel (DPDCH) in the uplink direction and in the downlink direction, respectively (in other words, the DPCCH and the DPDCH are established, symbolized in FIG. 9 by a reference numeral 914).

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for synchronizing a plurality of mobile radio devices, comprising:

transmitting a downlink synchronization signal in a shared downlink synchronization channel a plurality of mobile radio devices, wherein the downlink synchronization signal is common to the plurality of mobile radio devices; and receiving a plurality of uplink synchronization signals via a plurality of dedicated uplink synchronization channels, wherein each uplink synchronization signal indicates that a respective mobile radio device has synchronized to the shared downlink synchronization channel;

wherein the method is carried out during a handover procedure from a first mobile radio communication system to a second mobile radio communication system;

wherein the downlink synchronization signal is received by the plurality of mobile radio devices; and wherein each mobile radio device of the plurality of mobile radio devices transmits a respective uplink synchronization signal via a respective dedicated uplink synchronization channel of the plurality of dedicated uplink synchronization channels; and wherein the first mobile radio communication system is a Global Systems for Mobile Communications mobile radio communication system or a Universal Mobile Telecommunications System and wherein the second mobile radio communication system is a Universal Mobile Telecommunications System Long Term Evolution mobile radio communication system; or wherein the first mobile radio communication system is a Universal Mobile Telecommunications System Long Term Evolution mobile radio communication system and wherein the second mobile radio communication system is a Global Systems for Mobile Communications mobile radio communication system or a Universal Mobile Telecommunications System.

2. The method of claim 1, wherein the shared downlink synchronization channel is a shared downlink synchronization control channel.

3. The method of claim 1, wherein the shared downlink synchronization channel is a frequency division duplex shared downlink synchronization control channel.

4. The method of claim 1, wherein the plurality of dedicated uplink synchronization channels are a plurality of dedicated uplink synchronization control channels.

5. The method of claim 1, wherein the plurality of dedicated uplink synchronization channels are a plurality of dedicated physical control channels.

6. The method of claim 1, wherein the downlink synchronization signal comprises transmit power control information indicating a power control procedure to be used.

7. The method of claim 1, wherein the downlink synchronization signal comprises pilot signal information shared by the plurality of mobile radio devices.

8. The method of claim 1, wherein the method is carried out in a frequency division duplex mode.

9. The method of claim 1, wherein the method is carried out in a cellular mobile radio communication system.

10. The method of claim 9, wherein the method is carried out in accordance with a mobile radio communication system selected from a group of mobile radio communication systems consisting of Universal Mobile Telecommunications System mobile radio communication system; Code Division Multiple Access 2000 mobile radio communication system; and Freedom of Mobile Multimedia Access mobile radio communication system.

11. A mobile radio device, comprising:
a transmitter configured to transmit a downlink synchronization signal in a shared downlink synchronization channel to a plurality of mobile radio devices during a handover procedure from a first mobile radio communication system to a second mobile radio communication system, wherein the downlink synchronization signal is common to the plurality of mobile radio devices, wherein the downlink synchronization signal is received by the plurality of mobile radio devices; and
a receiver configured to receive a plurality of uplink synchronization signals via a plurality of dedicated uplink synchronization channels during the handover procedure, wherein each uplink synchronization signal indicates that a respective mobile radio device has synchronized to the shared downlink synchronization channel, each uplink synchronization signal transmitted by the respective mobile radio device via a respective dedicated uplink synchronization channel of the plurality of dedicated uplink synchronization channels;
and
wherein the first mobile radio communication system is a Global Systems for Mobile Communications mobile radio communication system or a Universal Mobile Telecommunications System and wherein the second mobile radio communication system is a Universal Mobile Telecommunications System Long Term Evolution mobile radio communication system; or
wherein the first mobile radio communication system is a Universal Mobile Telecommunications System Long Term Evolution mobile radio communication system and wherein the second mobile radio communication system is a Global Systems for Mobile Communications mobile radio communication system or a Universal Mobile Telecommunications System.

12. The mobile radio device of claim 11, wherein the shared downlink synchronization channel is a shared downlink synchronization control channel.

13. The mobile radio device of claim 11, wherein the shared downlink synchronization channel is a frequency division duplex shared downlink synchronization control channel.

14. The mobile radio device of claim 11, wherein the plurality of dedicated uplink synchronization channels are a plurality of dedicated uplink synchronization control channels.

15. The mobile radio device of claim 11, wherein the plurality of dedicated uplink synchronization channels are a plurality of dedicated physical control channels.

16. The mobile radio device of claim 11, wherein the downlink synchronization signal comprises transmit power control information indicating a power control procedure to be used.

17. The mobile radio device of claim 11, herein the downlink synchronization signal comprises pilot signal information shared by the plurality of mobile radio devices.

18. The mobile radio device of claim 11, wherein the mobile radio device is a cellular mobile radio device.

19. The mobile radio device of claim 11, wherein the mobile radio device is a mobile radio device selected from a group of mobile radio devices consisting of Universal Mobile Telecommunications System mobile radio device; Code Division Multiple Access 2000 mobile radio device; and Freedom of Mobile Multimedia Access mobile radio device.

20. The mobile radio device of claim 11, being a Global Systems for Mobile Communications mobile radio device or a Universal Mobile Telecommunications System mobile radio device or a Universal Mobile Telecommunications System Long Term Evolution mobile radio device.

21. The mobile radio device of claim 11, being a mobile radio network unit.

22. The mobile radio device of claim 21, being a mobile radio base station.

23. A mobile radio device, comprising:
a receiver configured to receive a downlink synchronization signal in a shared downlink synchronization channel shared by a plurality of mobile radio devices during a handover procedure from a first mobile radio communication system to a second mobile radio communication system, wherein the downlink synchronization signal is common to the plurality of mobile radio devices, wherein the downlink synchronization signal is received by the plurality of mobile radio devices; and
a transmitter configured to transmit an uplink synchronization signal via a dedicated uplink synchronization channel during the handover procedure, wherein each uplink synchronization signal indicates that a respective mobile radio device has synchronized to the shared downlink synchronization channel, each uplink synchronization signal transmitted by the respective mobile radio device via a respective dedicated unlink synchronization channel of the plurality of dedicated uplink synchronization channels;
and
wherein the first mobile radio communication system is a Global Systems for Mobile Communications mobile radio communication system or a Universal Mobile Telecommunications System and wherein the second mobile radio communication system is a Universal Mobile Telecommunications System Long Term Evolution mobile radio communication system; or
wherein the first mobile radio communication system is a Universal Mobile Telecommunications System Long Term Evolution mobile radio communication system and wherein the second mobile radio communication system is a Global Systems for Mobile Communications mobile radio communication system or a Universal Mobile Telecommunications System.

24. The mobile radio device of claim 23, wherein the shared downlink synchronization channel is a shared downlink synchronization control channel.

25. The mobile radio device of claim 23, wherein the shared downlink synchronization channel is a frequency division duplex shared downlink synchronization control channel.

26. The mobile radio device of claim 23, wherein the dedicated uplink synchronization channel is a dedicated uplink synchronization control channel.

27. The mobile radio device of claim 23, wherein the dedicated uplink synchronization channel is a dedicated physical control channel.

28. The mobile radio device of claim 23, wherein the downlink synchronization signal comprises transmit power control information indicating a power control procedure to be used.

29. The mobile radio device of claim 23, wherein the downlink synchronization signal comprises pilot signal information shared by the plurality of mobile radio devices.

30. The mobile radio device of claim 23, wherein the mobile radio device is a cellular mobile radio device.

31. The mobile radio device of claim 23, wherein the mobile radio device is mobile radio device selected from a group of mobile radio devices consisting of: Universal Mobile Telecommunications System mobile radio device; Code Division Multiple Access 2000 mobile radio device; and Freedom of Mobile Multimedia Access mobile radio device.

32. The mobile radio device of claim 23, being a Global Systems for Mobile Communications mobile radio device or a Universal Mobile Telecommunications System mobile radio device or a Universal Mobile Telecommunications System Long Term Evolution mobile radio device.

33. The mobile radio device of claim 23, being a mobile radio terminal device.

34. The mobile radio device of claim 33, being a mobile radio user equipment.

35. A method for synchronizing a mobile radio device, comprising:
- transmitting a downlink synchronization signal in a shared downlink synchronization channel to a mobile radio device, wherein the downlink synchronization signal is common to the plurality of mobile radio devices; and
- receiving an uplink synchronization signal via a dedicated uplink synchronization channel, wherein each uplink synchronization signal indicates that a respective mobile radio device has synchronized to the shared downlink synchronization channel;
- wherein the method is carried out during a handover procedure from a first mobile radio communication system to a second mobile radio communication system;
- wherein the downlink synchronization signal is received by the plurality of mobile radio devices; and wherein each mobile radio device of the plurality of mobile radio devices transmits a respective uplink synchronization signal via a respective dedicated uplink synchronization channel of the plurality of dedicated uplink synchronization channels;

and

- wherein the first mobile radio communication system is a Global Systems for Mobile Communications mobile radio communication system or a Universal Mobile Telecommunications System and wherein the second mobile radio communication system is a Universal Mobile Telecommunications System Long Term Evolution mobile radio communication system; or
- wherein the first mobile radio communication system is a Universal Mobile Telecommunications System Long Term Evolution mobile radio communication system and wherein the second mobile radio communication system is a Global Systems for Mobile Communication mobile communication system or a Universal Mobile Telecommunications System.

* * * * *

UNITED STATES PATENT AND TRADEMARK OFFICE
CERTIFICATE OF CORRECTION

| | | |
|---|---|---|
| PATENT NO. | : 8,780,884 B2 | Page 1 of 1 |
| APPLICATION NO. | : 11/696837 | |
| DATED | : July 15, 2014 | |
| INVENTOR(S) | : Hyung-Nam Choi et al. | |

It is certified that error appears in the above-identified patent and that said Letters Patent is hereby corrected as shown below:

In the Claims

Column 10 Claim 1
Line 8, "...channel a plurality..." should read --...channel to a plurality...--.

Column 11 Claim 17
Line 56, "...herein the downlink..." should read --...wherein the downlink...--.

Column 14 Claim 35
Line 23, "...Communication mobile radio..." should read --...Communications mobile radio...--.

Signed and Sealed this
Fifteenth Day of September, 2015

Michelle K. Lee
*Director of the United States Patent and Trademark Office*